(12) United States Patent
Painchaud-April et al.

(10) Patent No.: US 12,372,499 B2
(45) Date of Patent: Jul. 29, 2025

(54) ULTRASOUND INSPECTION CALIBRATION USING A TARGET

(71) Applicant: Evident Canada, Inc., Québec (CA)

(72) Inventors: Guillaume Painchaud-April, L+3 Ancienne-Lorette (CA); Benoit Lepage, L+3 Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 158 days.

(21) Appl. No.: 17/445,229

(22) Filed: Aug. 17, 2021

(65) Prior Publication Data

US 2022/0113285 A1 Apr. 14, 2022

Related U.S. Application Data

(60) Provisional application No. 63/089,708, filed on Oct. 9, 2020.

(51) Int. Cl.
| | |
|---|---|
| *G01N 29/30* | (2006.01) |
| *G01N 29/04* | (2006.01) |
| *G01N 29/24* | (2006.01) |
| *G01N 29/28* | (2006.01) |

(52) U.S. Cl.
CPC .......... *G01N 29/30* (2013.01); *G01N 29/041* (2013.01); *G01N 29/2437* (2013.01); *G01N 29/28* (2013.01); *G01N 2291/023* (2013.01); *G01N 2291/0289* (2013.01); *G01N 2291/0423* (2013.01); *G01N 2291/106* (2013.01)

(58) Field of Classification Search
CPC .. G01N 29/30; G01N 29/041; G01N 29/2437; G01N 29/28; G01N 2291/023; G01N 2291/0289; G01N 2291/0423; G01N 2291/106; G01N 2291/011; G01N 29/07; G01N 29/262; G01N 29/4418

See application file for complete search history.

(56) References Cited

U.S. PATENT DOCUMENTS

| | | | |
|---|---|---|---|
| 7,578,166 | B2 | 8/2009 | Ethridge et al. |
| 8,521,446 | B2 | 8/2013 | Zhang et al. |
| 9,880,133 | B1* | 1/2018 | Stephanou ............. G01N 29/07 |
| 10,309,934 | B2 | 6/2019 | Brütt et al. |
| 2006/0065055 | A1* | 3/2006 | Barshinger .......... G01N 29/262 73/609 |
| 2018/0284069 | A1* | 10/2018 | Brütt ..................... G01N 29/262 |
| 2020/0149980 | A1* | 5/2020 | Roth .................... G01N 29/075 |
| 2021/0207985 | A1* | 7/2021 | Kim ........................ G01F 1/666 |

OTHER PUBLICATIONS

Acoustic Velocity, Impedance, Reflection, Transmission, Attenuation, and Acoustic Etalons.*

* cited by examiner

*Primary Examiner* — Xin Y Zhong
(74) *Attorney, Agent, or Firm* — Schwegman Lundberg & Woessner, P.A.

(57) ABSTRACT

Examples of the present subject matter provide a calibration technique to configure inspection parameters directly on an object. The calibration technique may include a target device configured to be placed on a testing surface of an object for calibration. The target device may reflect acoustic waves transmitted from a transducer probe. The reflected acoustic waves may then be used for determining one or more characteristics of the object.

20 Claims, 10 Drawing Sheets

ULTRASOUND INSPECTION CALIBRATION USING A TARGET

CROSS-REFERENCE TO RELATED APPLICATION

This application claims the benefit of priority to U.S. Provisional Patent Application Ser. No. 63/089,708, filed Oct. 9, 2020, the contents of which are hereby incorporated by reference in their entirety.

TECHNICAL FIELD

The present disclosure generally relates to calibration of ultrasound inspection components.

BACKGROUND

Calibration of acoustic inspection system elements can involve a complex process and can consume a significant amount of time. In some instances, calibration blocks are used to calibrate inspection components, such as for performing an amplitude calibration. For example, an acoustic transducer probe that is going to be used for inspection can be acoustically coupled to a calibration block for calibration. The calibration block can be a metal block and can include drilled holes, such as to emulate standard flaws or otherwise provide features emulating flaws in known locations. For calibration, the transducer probe may perform inspection of the calibration block. Based on the known properties of the calibration blocks, e.g., holes emulating flaws, aspects of the acoustic inspection system may be calibrated such as relating to the transducer probe or to other elements in the inspection signal chain.

Generally, after calibration, the transducer probe is acoustically decoupled from the calibration block and then acoustically coupled to the object for inspection (e.g., object-under-test). Thus, the calibration performed on the separate calibration block may not be accurate for the object. For example, the object and the calibration block can have different properties, surface roughness, acoustic impedances, and mechanical coupling configurations, etc. Assumptions may be made by the operator to compensate for such differences. However, if such assumptions made in calibration are inaccurate or incomplete, they can adversely impact the testing results.

BRIEF DESCRIPTION OF THE DRAWINGS

Various ones of the appended drawings merely illustrate example implementations of the present disclosure and should not be considered as limiting its scope.

DETAILED DESCRIPTION

The inventors have recognized a need in the art for a calibration technique that, among other things, overcomes the drawbacks discussed above. Examples of the present subject matter can provide a calibration technique to determine inspection parameters for use in evaluating an object, such as using a propagation path including the object. For example, the calibration technique may include a target device (e.g., a calibration target assembly) configured to be placed on a surface of an object for calibration. The surface can be the same surface as is used for mechanically coupling an acoustic transducer probe to the object. In another example, the target device and acoustic transducer probe may be placed on different surfaces (e.g., opposing surfaces of an object). The target device may reflect acoustic waves transmitted from a transducer probe. The reflected acoustic waves may then be used for determining one or more characteristics of the object. Hence, the calibration is performed while the transducer probe is coupled to the object, leading to more accurate results at least in part because the propagation characteristics and related constitutive parameters of the object are factored into the calibration technique.

This document describes an inspection system. The inspection system may include a transducer probe configured to transmit an acoustic wave from a first location on an object. The inspection system may also include a target configured to reflect the transmitted acoustic wave from a second location on the object to produce a reflection of the acoustic wave. The inspection system may further include a control circuit configured to receive information about the reflection of the acoustic wave for determination of at least one characteristic relating to the object.

This document also describes a method comprising: placing a transducer probe at a first location on a surface of an object; placing a target at a second location on the surface of the object; transmitting an acoustic wave from the transducer probe into the object to the target; receiving the acoustic wave; and based on measurements of the received acoustic wave, simultaneously determining a plurality of characteristics relating to the object.

This document further describes an inspection system including a first transducer probe configured to transmit an acoustic wave into an object from a first location on the object and a second transducer probe configured to receive the acoustic wave from a second location on the object using a transducer element having a size approximately $\lambda/2$, where $\lambda$ is a wavelength of the acoustic wave. The inspection system may also include a control circuit configured to receive information about the received acoustic wave and to simultaneously determine a plurality of characteristics relating to the object.

Figure 1:
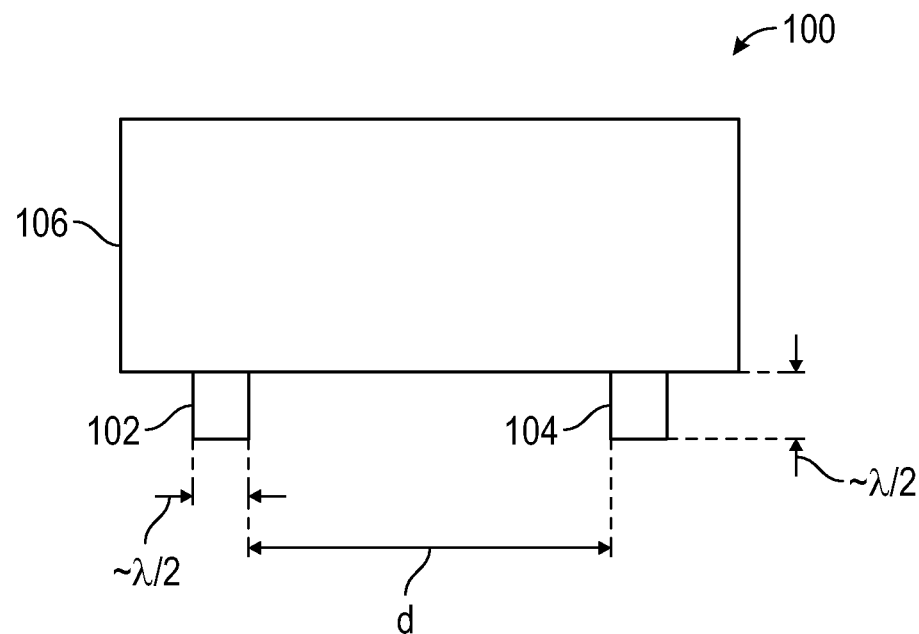
FIG. 1 illustrates a target device, according to an example of the present disclosure.

FIG. 1 illustrates a target device 100, according to an example of the present subject matter. The target device 100 may include targets 102, 104 and a target holder 106. As described in further detail below, the target device 100 may be used for calibration of a transducer probe to configure inspection parameters derived directly from an object to be tested. The targets 102, 104 may be made of a material having a relatively high acoustic impedance compared to free space. For example, the targets 102, 104 may be made of the same or similar material as an object, such as comprising a metal. For example, the targets 102, 104 may be provided as metallic structures protruding from the target holder 106. The targets 102, 104 may be provided using a material with an acoustic impedance that substantially matches an acoustic impedance of the object. The width and height (e.g., size) of the targets 102, 104 may be set to approximately to $\lambda/2$, where $\lambda$ is a wavelength of an acoustic wave within the target material (object) to be used with the target device 100, as described in further detail below. The targets 102, 104 may be spaced apart by a distance "d." The gap between the targets can be free space or a material having acoustic characteristics contrasting with the targets 102, 104, such as similar to the target holder material 106. Two targets are shown in FIG. 1 for illustration purposes; one target or more than two targets may be provided with the target device.

The target holder 106 may be made of a material of relatively lower acoustic impedance as compared to the targets 102, 104. For example, the target holder 106 may be a polymer material. Because the target holder 106 may be of relatively lower impedance than the targets 102, 104, the target holder 106 may insulate the targets 102, 104. That is, acoustic waves traversing the targets 102, 104 may not propagate into the target holder 106. Instead, the acoustic waves may diffract, scatter, and then reflect from inside the targets 102, 104. In this manner, the targets 102, 104 may imitate a flaw in the object.

Figure 2:
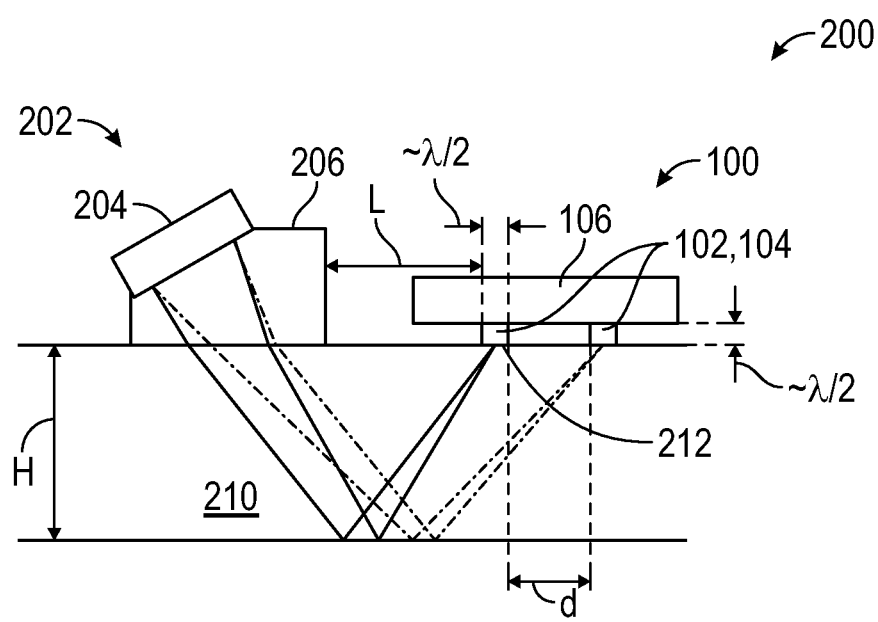
FIG. 2 illustrates an inspection system, according to an example of the present disclosure.

FIG. 2 illustrates an inspection system 200 according to an example of the present subject matter. The inspection system 200 may include a target device 100 (as described above) and an inspection device 202 with a transducer probe 204 (e.g., comprising an array of electroacoustic transducers) and a wedge 206.

Figure 3:
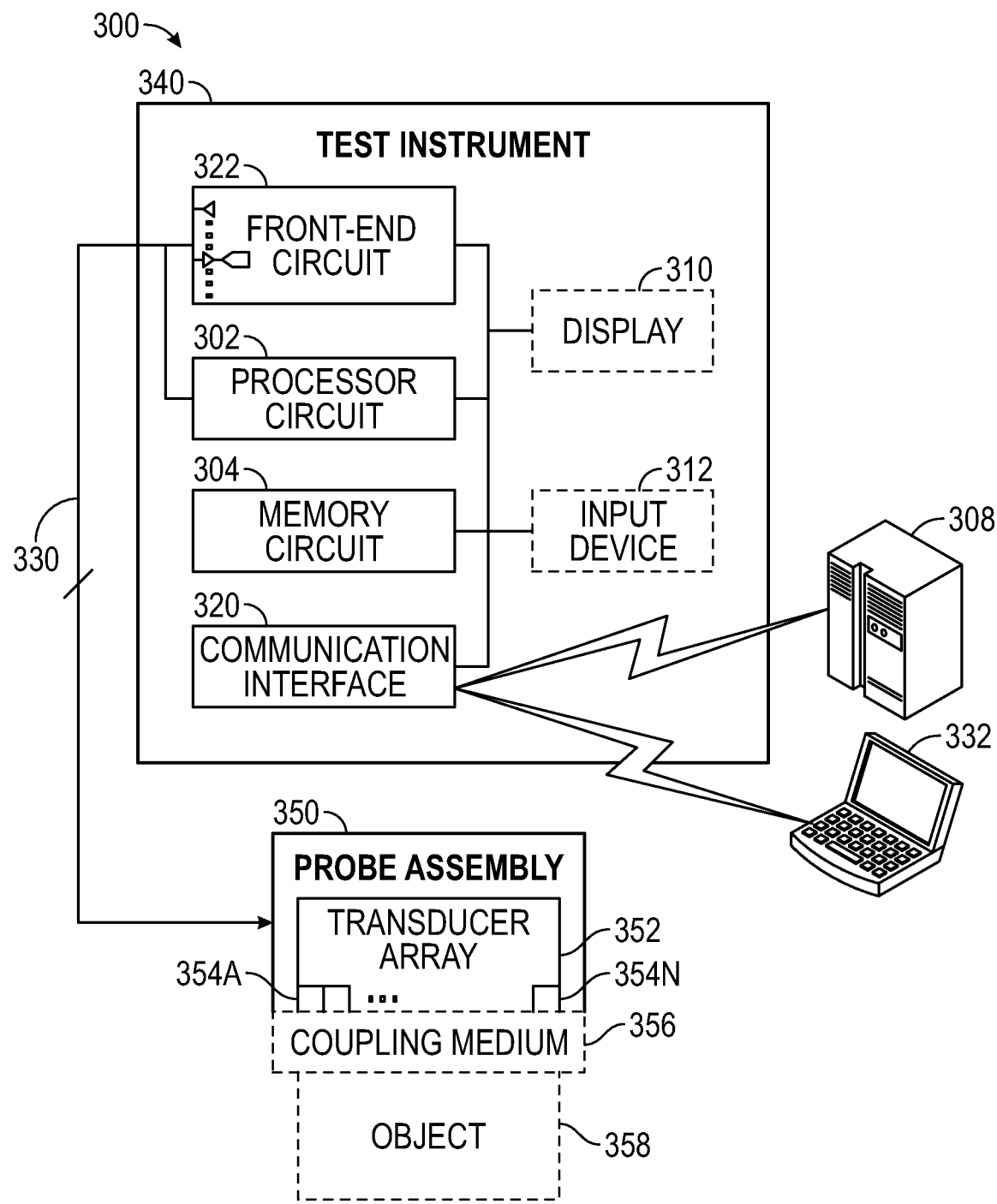
FIG. 3 illustrates an inspection device, according to an example of the present disclosure.

The inspection device may generate, transmit, and receive acoustic waves as described herein. FIG. 3 illustrates generally an example comprising an inspection system 300 in which inspection device 202 may operate, such as can be used to perform one or more techniques showed and described elsewhere herein. The inspection system 300 may include a test instrument 340, such as a hand-held or portable assembly, including a processor circuit 302, a memory circuit 304, a display 310, an input device 312, a communication interface 320, and a front-end circuit 322. The test instrument 340 may be electrically coupled to a probe assembly, such as using a multi-conductor interconnect 330. The probe assembly 350 may include one or more electroacoustic transducers, such as a transducer array 352 including respective transducers 354A through 354N. The transducers array may follow a linear or curved contour, or may include an array of elements extending in two axes, such as providing a matrix of transducer elements. The elements need not be square in footprint or arranged along a straight-line axis. Element size and pitch may be varied according to the inspection application.

A modular probe assembly 350 configuration may be used, such as to allow a test instrument 340 to be used with different types of probe assemblies 350. Generally, the transducer array 352 includes piezoelectric transducers, such as can be acoustically coupled to a object 210 (e.g., an object under test) through a coupling medium 356. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 356 during testing.

The test instrument 340 can include digital and analog circuitry, such as a front-end circuit 322 including one or more transmit signal chains, receive signal chains, or switching circuitry (e.g., transmit/receive switching circuitry). The transmit signal chain can include amplifier and filter circuitry, such as to provide transmit pulses for delivery through an interconnect 330 to a probe assembly 350 for insonification of the target 358, such as to measure one or more characteristics of the object 358 such as for determining a dimension of a object (e.g., a thickness) or a location or existence of a flaw on or within the object based on receiving scattered or reflected acoustic energy elicited in response to the insonification, e.g., echoes.

While FIG. 3 shows a single probe assembly 350 and a single transducer array 352, other configurations may be used, such as multiple probe assemblies connected to a single test instrument 340, or multiple transducer arrays used with a single or multiple probe assemblies 350 for tandem inspection. Similarly, a test protocol can be performed using coordination between multiple test instruments 340, such as in response to an overall test scheme established from a master test instrument 340, or established by another remote system such as a compute facility 308 or general purpose computing device such as a laptop 332, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 322 can include one or more filters or amplifier circuits, along with an analog-to-digital conversion facility, such as to digitize echo signals received using the probe assembly 350. Digitization can be performed coherently, such as to provide multiple channels of digitized data aligned or referenced to each other in time or phase.

Returning to FIG. 2, the inspection device 202 and the target device 100 may be placed on a surface of an object 210. For calibration, the inspection device 202 may be placed at a first location on the surface of the object 210. The target device 100 may be placed on the surface of the object 210 so that the first target 102 is located at a second location and the target 104 is located at a third location. A coupling material 212 may be provided in between the surface of the object 210 and the targets 102, 104. For example, the coupling material may include a fluid or gel. The type of coupling material 212 may be selected based on the testing environment. In an example, the coupling material 212 may be water-based. In another example (e.g., a cold testing environment), the coupling material 212 may be alcohol-based. The coupling material may also be chosen based on the testing method. For example, testing using longitudinal (L) waves may use a first family of couplants while testing using shear or transverse waves may use a second family of couplants.

In another example, the inspection device 202 and the target device 100 may be placed on different surfaces of the object 210. For example, they may be placed on opposing surfaces of the object 210. That is, the inspection device 202 may be placed at a first location on a first surface of the object 210, and the target device 210 may be placed on a second surface of the objection 210 where the target devices so that the first target 102 is located at a second location on the second surface and the target 104 is located at a third location on the second surface.

Figure 4:
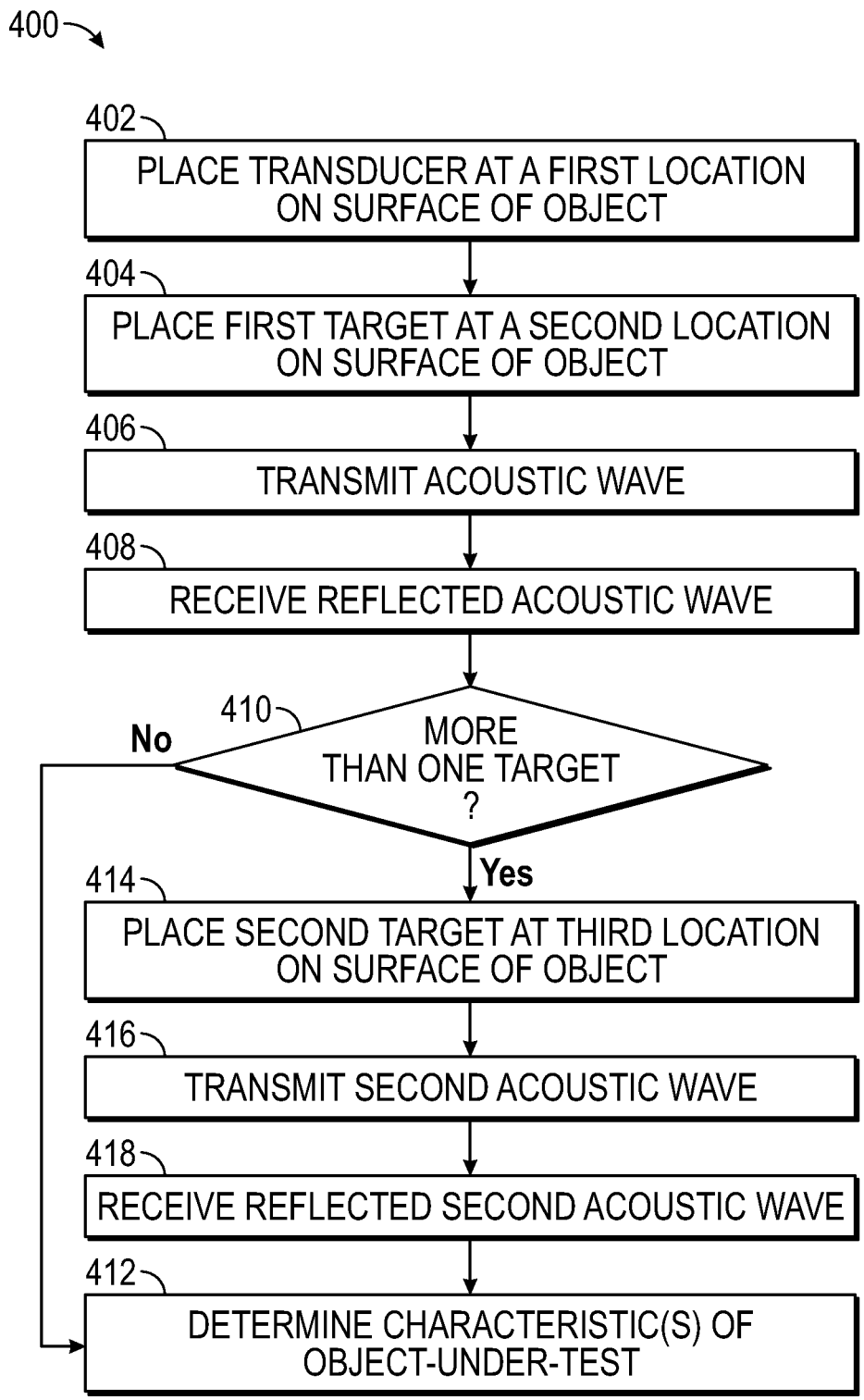
FIG. 4 illustrates a flow diagram of a calibration method, according to an example of the present disclosure.

FIG. 4 is a flow diagram of a calibration method 400, according to an example of the present subject matter. Method 400 may be performed by the inspection system 200 described above. At 402, an inspection device with a transducer probe (e.g., 202 as shown in FIG. 2) may be placed at a first location on a surface of an object. At 404, a first target (e.g., 102 as shown in FIG. 2) may be placed at a second location on the surface of the object. The inspection device and the first target may be spaced apart by a distance L. As discussed above, in another example, the inspection device and the first target may be placed on different surfaces of the object. At 406, an acoustic wave may be transmitted by the transducer probe into the object. In the example of FIG. 2, the acoustic wave may travel along a propagation path through the object including reflecting or scattering off a surface opposite the transducer probe (e.g., backwall), to reach the first target, including traversing a vertical thickness, "H" defined by the object. The acoustic wave may then be reflected or scattered by the target, with reflected or scattered acoustic energy traveling back through the object as shown by the dotted-and-dashed-lines in FIG. 2. Referring to FIG. 4, at 408, the transducer probe may receive the reflected acoustic wave. In an example, a first transducer element of the transducer probe may transmit the acoustic wave and a second (e.g., different) transducer element of the transducer probe may receive the reflected acoustic wave.

At 410, the method 400 may check if one or two targets are being used. If only one target is to be used, a control circuit, at 412, may take information relating to and from the received acoustic wave (e.g., time of travel) and determine one or more characteristics relating to the object. The characteristics may include absorption per length, velocity, amplitude, thickness, a geometrical characteristic, and/or sensitivity. For example, if a distance between the inspection device and the target (L) and the thickness of the object (H) is known, then an acoustic propagation velocity (e.g., a group velocity) in the object may be determined based on the time-of-travel of the acoustic wave.

In an example, the control circuit may input information relating to the received acoustic wave into a calibration model or map. Based on the model or map, different parameters of the object may be calculated. With the use of a model, parameters for other configurations may also be calculated. For example, if the inspection aim is for an one inch thick material, the model may set the inspection device for a setting to detect a defect or flaw for an one inch thick material based on the one or more characteristics calculated during calibration; the setting may include, for example, automatic gain control and compensation matching.

At 414, if more than one target is to be used, a second target (e.g., 104) may be placed at a third location on the surface of the object. The inspection device and the first target may be spaced apart by a distance L and the first and second targets may be space apart by a distance d, so the inspection device and the second target may be spaced apart by a distance L+d. At 416, a second acoustic wave may be transmitted by the transducer probe into the object. In the example of FIG. 2, the second acoustic wave may travel along a propagation path through the object including reflecting or scattering off a surface opposite the transducer probe (e.g., backwall), to reach the second target, including traversing a vertical thickness, "H" defined by the object. The acoustic wave may then be reflected or scattered by the second target, with reflected or scattered acoustic energy traveling back through the object as shown by the dotted-and-dashed-lines in FIG. 2. Referring to FIG. 4, at 418, the transducer probe may receive the second reflected acoustic wave. In an example, a first transducer element of the transducer probe may transmit the first and second acoustic waves and a second transducer element of the transducer probe may receive the reflected first and second acoustic waves from the first and second targets, respectively.

At 410, the control circuit may take the information from the received acoustic waves from the first and second targets and determine one or more characteristics relating to the object. The characteristics may include absorption per length, velocity, amplitude, thickness, a geometrical characteristic, and/or sensitivity. In an example, H may not be known a priori. Using multiple targets, say two, and assuming constant velocity (a first unknown variable) and constant thickness H (a second unknown variable), the control circuit may calculate estimates of H and velocity based on the time of flight and other known properties (e.g., distance of the targets). Using more targets may provide further insight into the geometry of the object (e.g., slope of the backwall), or provide "over determination" data for measurement uncertainty, for example.

As discussed above, the control circuit may also input information relating to the received acoustic waves into a calibration model or map. Based on the model or map, different parameters of the object may be calculated. With the use of a model, parameters for other configurations may also be calculated.

Figure 5A:
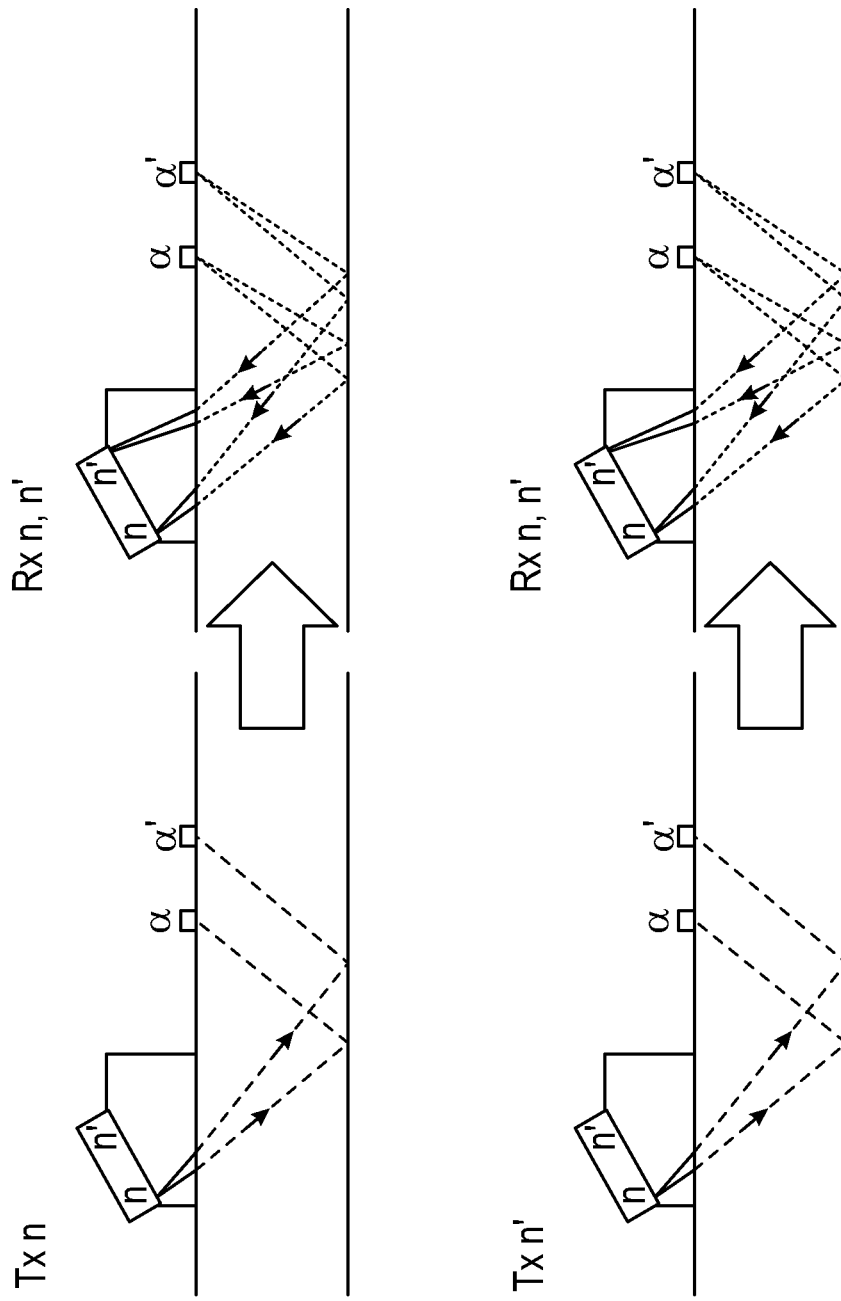
FIGS. 5(A)-(C) illustrate a technique for calculating a parameter of an object, according to an example of the present disclosure.

For example, one technique of using a target device, as described herein, to evaluate the numeric value of some physical parameters of the object may involve building a system of equations, including at least as many observations as there are unknowns in the system. Thus, a plurality of physical parameters may be determined simultaneously. FIG. 5(A) illustrates a technique for calculating a parameter of an object according to an example of the present subject matter. Here, the sound speed of a P-wave and a thickness of the object may be calculated using a target device, as described herein. In FIG. 5(A), two targets are depicted. Echoes from the two targets using two transducer elements may be collected; the two transducer elements may be fired individually as shown. The echoes may be identified based on their pairing. In FIG. 5(A), the transducer elements are labeled n and n', and the targets are labeled a and a'.

Figure 5B:
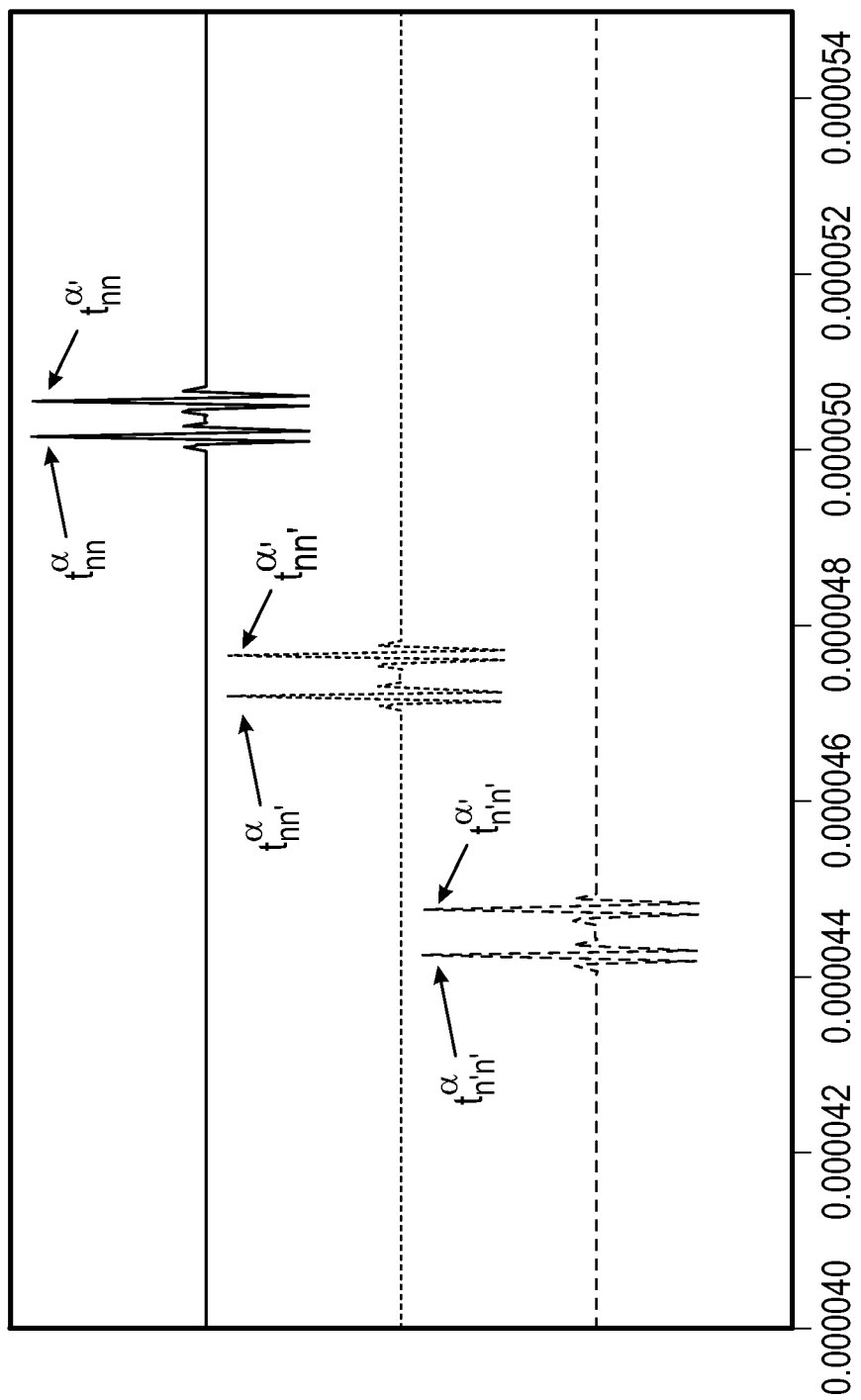

FIG. 5(B) illustrates a time series of acquisition combination according to an example of the present subject matter. The echoes may come in a pair using the two targets in this example. Three time-series acquisitions may be used: (i) the detected signal from first element n to first element n; (ii) the detected signal from element n to second element n'; and (iii) the detected signal from second element n' to second element n'. Thus, a total of six time-values for the position of echoes may be found.

A model for the time of flight may be drawn based on assumptions about the propagation material (e.g., material is linear isotropic and homogenous, and the object is a constant thickness). Hence, the total time of flight may include a going segment and a returning segment:

round trip to $\alpha$: $t^\alpha_{PPn'-PPn} = \underbrace{\Delta t^\alpha_{PPn}}_{\text{going}} + \underbrace{\Delta t^\alpha_{PPn'}}_{\text{returning}}$ Moreover, each segment may be cast as a path segment in the wedge and second path segment in the object to inspect:

$$\Delta t^\alpha_{PPn} = \underbrace{\frac{1}{C_A}\left[\frac{h_n}{\cos X^\alpha_{An}}\right]}_{\text{wedge}} + \underbrace{2\frac{1}{C_{BP}}\left[H\sqrt{1+\left(\frac{2H}{D^\alpha_n + L^\alpha}\right)^2}\right]}_{\text{combined 1st and 2nd legs}}$$

and $$D^\alpha_n = D_n - h_n \tan X^\alpha_{An}$$

Figure 5C:
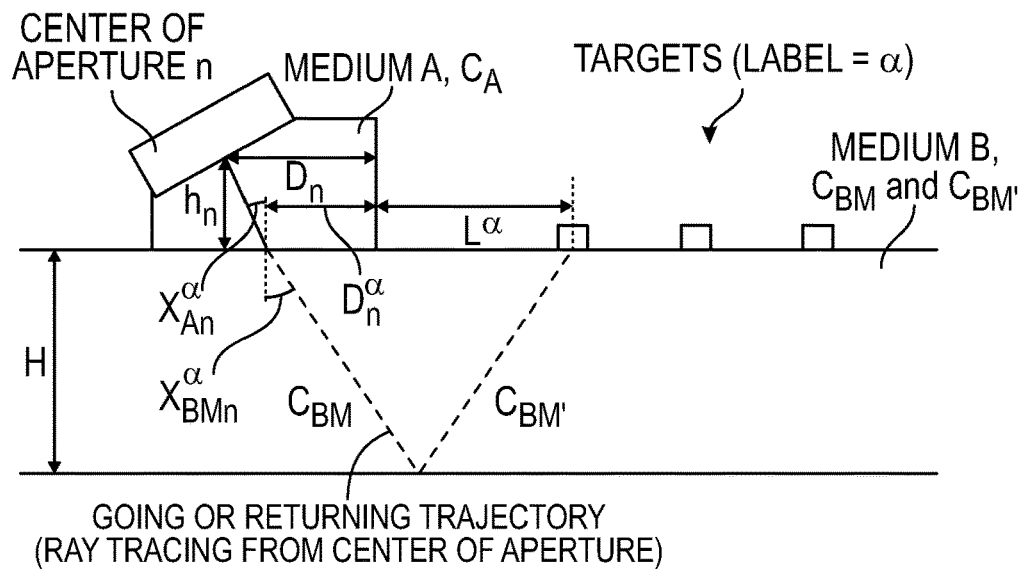

FIG. 5(C) illustrates the terms used in the above equations. Here, the distance to the target ($L^\alpha$) may be a known parameter, as well as other parameters except the sound speed $C_{BP}$ and the object thickness H as well as the four incidence angles at the object surface. Six equations for the six different time of flights to the six observations may be assembled. For these six equations, the sound speed $C_{BP}$ and the object thickness H may be simultaneously calculated. The following table may summarize the known/observed quantities and the set of unknowns to be evaluated:

| Known | Unknown | | | |
|---|---|---|---|---|
| $t^\alpha_{nn}$ | $\chi^\alpha_{An}$ | $\chi^\alpha_{An}$ | $c_{BP}$ | H |
| $t^{\alpha'}_{nn}$ | $\chi^{\alpha'}_{An}$ | $\chi^{\alpha'}_{An}$ | $c_{BP}$ | H |
| $t^\alpha_{nn'}$ | $\chi^\alpha_{An}$ | $\chi^\alpha_{An'}$ | $c_{BP}$ | H |
| $t^{\alpha'}_{nn'}$ | $\chi^{\alpha'}_{An}$ | $\chi^{\alpha'}_{An'}$ | $c_{BP}$ | H |
| $t^\alpha_{n'n'}$ | $\chi^\alpha_{An'}$ | $\chi^\alpha_{An'}$ | $c_{BP}$ | H |
| $t^{\alpha'}_{n'n'}$ | $\chi^{\alpha'}_{An'}$ | $\chi^{\alpha'}_{An'}$ | $c_{BP}$ | H |

Different approaches may be used, including a simplex method, a gradient method, and/or a Newton-Raphson method. Additional targets (also having other sets of transmitting and receiving elements) may be used to build an overdetermined system of equations. Moreover, the example here is for obtaining estimates for the P-wave sound seed and the object thickness using a data set from a PP-PP round trip, but this concept may also be performed for S-wave sound speed using a SS-SS round trip.

Another parameter of interest may be the acoustic propagation loss factor, which may be linked to material scattering and thermal losses. For example, the acoustic propagation loss factor may affect the level of gain to add to the received signal to equalize its value through some region of interest in the object. The acoustic propagation loss may be modeled as a linear loss with propagation distance (e.g., exponential decay of the amplitude), which may be different from the geometric attenuation associated with the expansion from a finite size source as it may be intrinsic to the material and can be measured empirically.

Figure 6A:
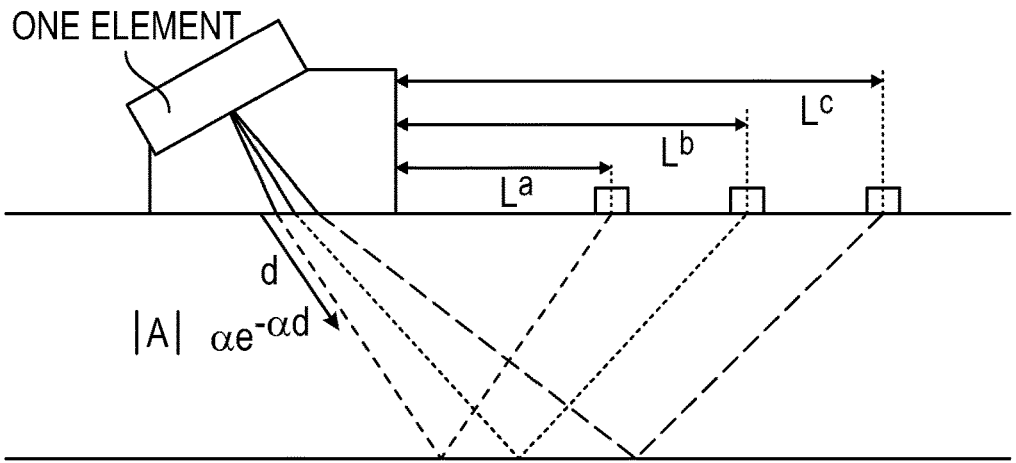
FIGS. 6(A)-(D) illustrate a technique for calculating an acoustic propagation loss parameter of an object, according to an example of the present disclosure.
Figure 6B:
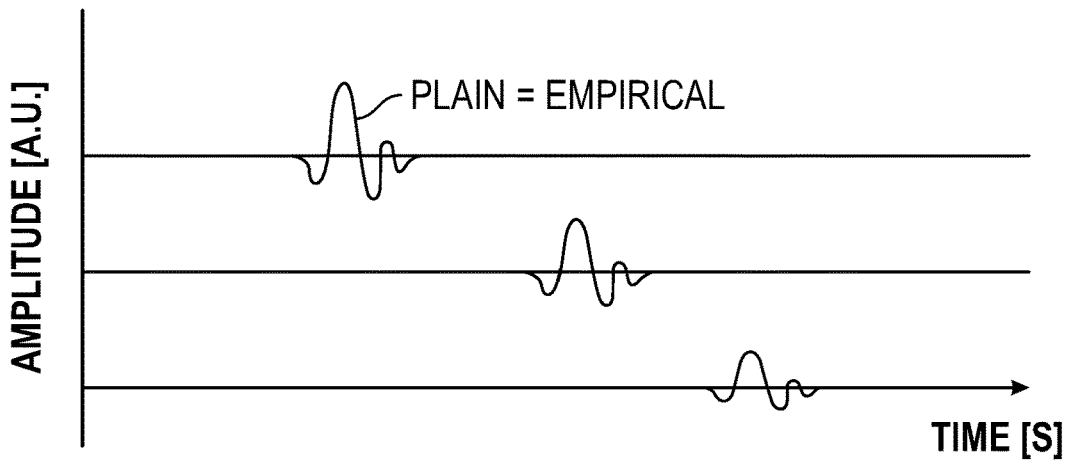

FIG. 6(A) illustrates a technique for calculating an acoustic propagation loss parameter of an object according to an example of the present subject matter. FIG. 6(B) illustrates exemplary signals from the targets observed at the receiver element. One technique to evaluate the acoustic propagation loss factor is with the use of an acoustic model for the response amplitude A(t) from a flaw in the object. Such a model may be based on the superposition of the contribution from multiple elements amplitude ($A_{nn'}(t)$) to the received signal:

$$A(t) = \Sigma_{n,n'} A_{nn'}(t)$$

The loss factor may be introduced in the model from the path in the part from one transmitting element to a receiving element:

$$A(t) = \Sigma_{n,n'} A_{nn'}(t) e^{-\alpha d_{nn'}}$$

Figure 6C:
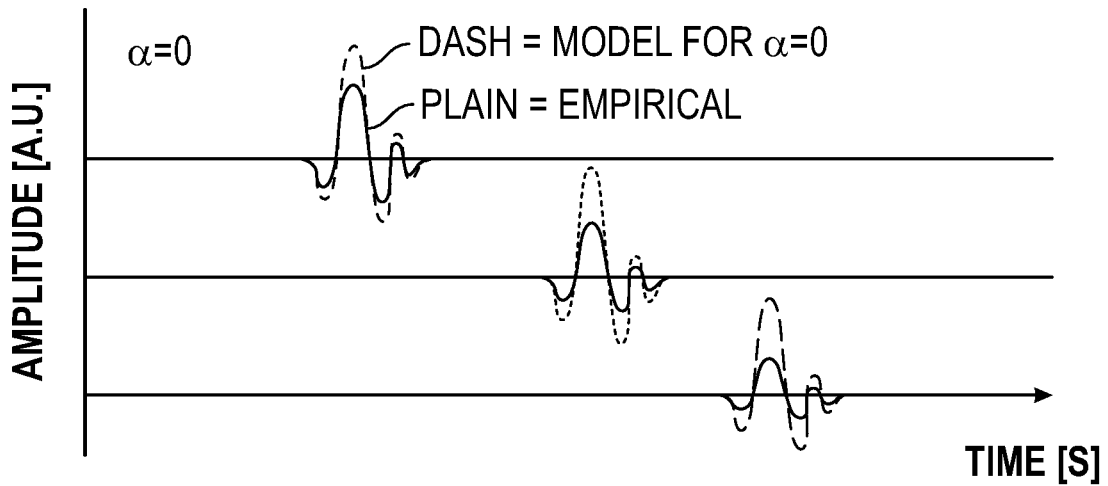
Figure 6D:
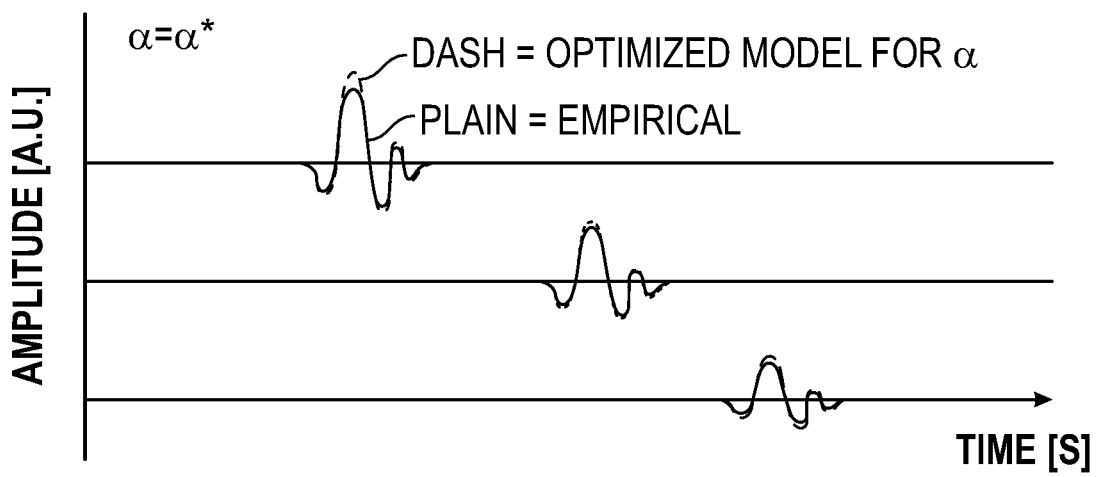

An acquisition scheme that produces sufficient data to evaluate a is based on the projection of beams in transmission and reception on the targets. Other propagation parameters may be known to produce physical beams that correspond to model beams. FIGS. 6(C) and 6(D) show initial and optimal models. The solution to determine the acoustic propagation loss factor may be based on the computation of a lossless model amplitude response from element n to another element n', as the loss factor $\alpha$ is varied until the difference between the observed time traces and the model time traces become minimal. Because the optimization process may be affected by the signal phase, which would often be considered another variable to optimize, signal enveloping technique may be used (instead of the RF signal). Once the optimal loss factor ($\alpha = \alpha'$) is found, it may be used in the model to produce a compensation map that is effective in the region of interest.

Figure 7:
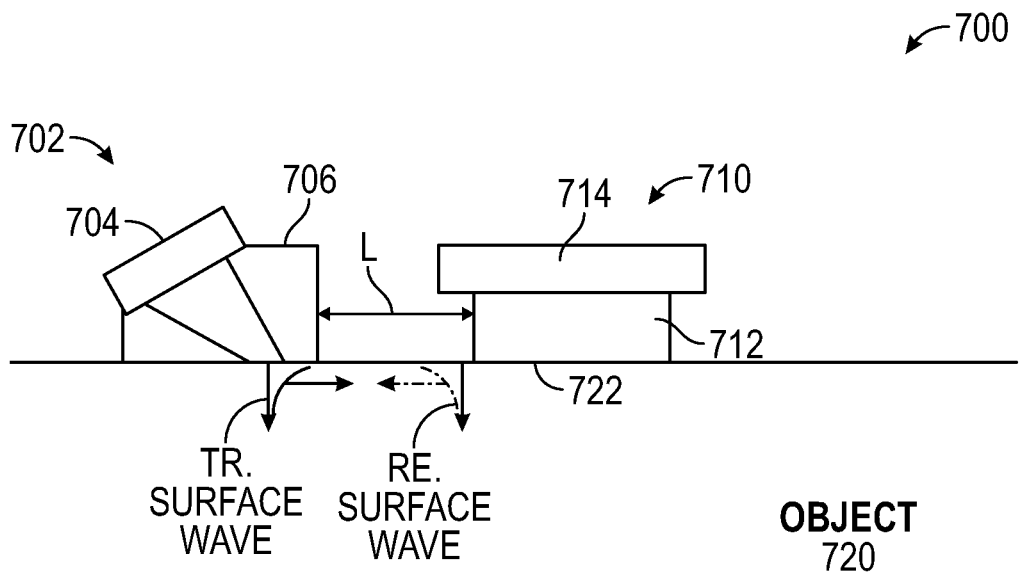
FIG. 7 illustrates an inspection system, according to an example of the present disclosure.

The above examples depicted an object with a defined or known thickness. The calibration techniques described herein may also be applied for objects whose thickness is unknown to use reflections off a backwall. FIG. 7 illustrates an inspection system 700, according to an example of the present subject matter. The inspection system 700 may include an inspection device 702 with a transducer probe 704 and a wedge 706, and the inspection system 700 may also include a target device 710. The inspection device 702 may be provided as described above with reference to FIG. 2 and/or FIG. 3.

The target device 710 may include a target 712 and a target holder 714. As described herein, the target device 710 may be used for calibration of a transducer probe to configure inspection parameters directly on the object to be tested. The target 712 may be made of a material of relatively high acoustic impedance. The target 712 may operate as surface wave breaker. For example, the target 712 may be made of the same or similar metal as an object 720. The target may be provided as a shard of metal. The target 712 may be provided with a material with an acoustic impedance that substantially matches an acoustic impedance of the object 720.

Here, the object 720 may be a thick/deep part or where the backwall geometry may non-uniform. Thus, using reflections of the backwall of the object 720 may not be effective. The inspection device 702 may use surface wave(s) for calibration, as described in further detail below.

The inspection device 702 and the target device 710 may be placed on a surface of an object 720. For calibration, the inspection device 702 may be placed at a first location on the surface. The target device 710 may be placed on the surface so that the closest corner of the target 702 to the inspection device 702 is located at a second location. A coupling material 722 may be provided in between the surface of the object 720 and the 712. For example, the coupling material may include a fluid or gel. The type of coupling material 722 may be selected based on the testing environment. In an example, the coupling material 722 may be water-based. In another example (e.g., a cold testing environment), the coupling material 722 may be alcohol-based. The coupling material may also be chosen based on the testing method.

Figure 8:
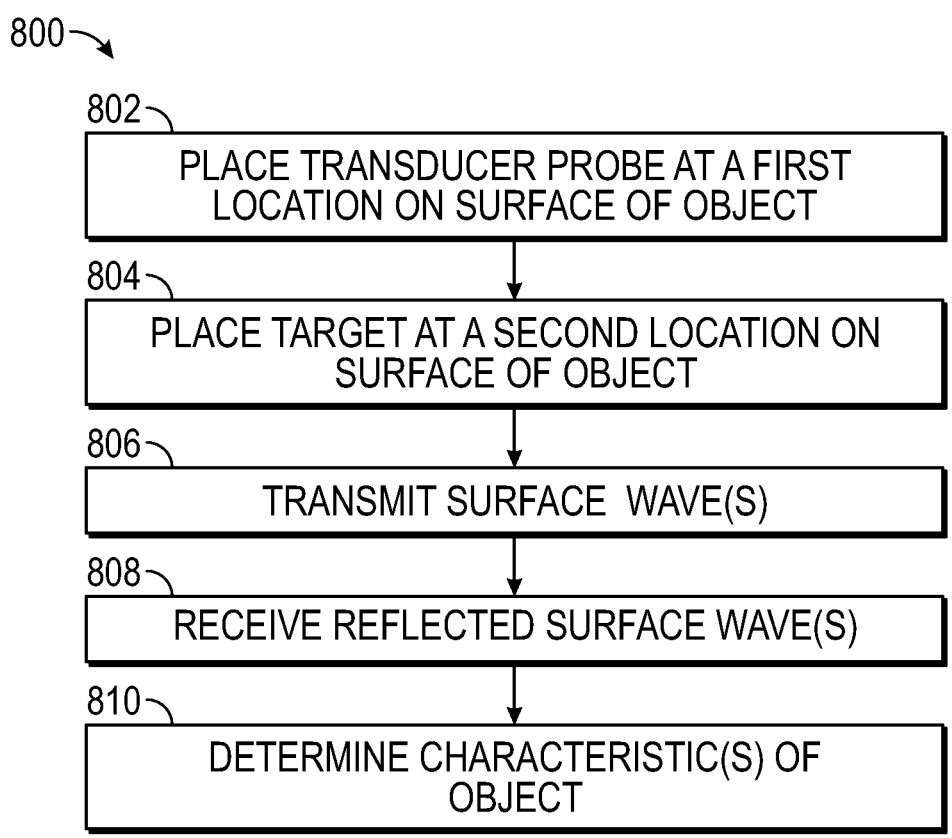
FIG. 8 illustrates a flow diagram of a calibration method using surface wave(s), according to an example of the present disclosure.

FIG. 8 is a flow diagram of a calibration method 800 using surface wave(s), according to an example of the present subject matter. Method 800 may be performed by the inspection system 700 described above with reference to FIG. 7. At 802, an inspection device with a transducer probe (e.g., 702 of FIG. 7) may be placed at a first location on a surface of an object. At 804, a target (e.g., 722 of FIG. 7) may be placed at a second location on the surface of the object. The inspection device and the closest corner of the target may be spaced apart by a distance L.

At 806, surface wave(s) may be transmitted by the transducer probe onto the surface of the object. The surface wave is a type of acoustic wave and may include a mixture of P-waves and Rayleigh waves, where the P-waves are P-polarized (vibrations parallel to the propagation direction) and the Rayleigh waves are a mixture of P- and S-polarizations (elliptical vibrations). The P-waves propagating in the surface wave, also known as lateral waves, may have the same velocity as bulk P-waves propagating in the volume of the object. In the present disclosure, use of the term "P-wave" will include both surface P-waves and bulk P-waves.

The critical angle for a P-wave may be different from the critical angle for a Rayleigh wave. The P-waves have an acoustic velocity $V_P$, and the Rayleigh waves have an acoustic velocity VR which is known to be linked to the velocities of both P- and S-waves ($V_P$ and $V_S$) in the object according to the following equation, which is well-known in the art (see for example, Jr. Lester W. Schmerr, Fundamentals of Ultrasonic Nondestructive Evaluation—A Modeling Approach, Plenum Press, 1998):

$$\left(2 - \frac{v_R^2}{v_S^2}\right)^2 - 4*\left(1 - \frac{v_R^2}{v_P^2}\right)^{\frac{1}{2}}*\left(1 - \frac{v_R^2}{v_S^2}\right)^{\frac{1}{2}} = 0$$

The surface wave may crawl on the surface of the object, reach the target (in particular, the corner of the target), and reflect back towards the transducer probe. At 808, the transducer probe may receive the reflected surface wave(s).

At 810, a control circuit may take the information from the received surface wave (e.g., time of flight) and determine one or more characteristics relating to the object. The characteristics may include absorption per length, velocity, amplitude, thickness, a geometrical characteristic, and/or sensitivity. The control circuit may use a calibration model or map, as described herein.

Moreover, the target devices described herein may be used during inspection, too. Keeping the target device on the object may allow instant calibration as the inspection device moves along the object-under test. This may be particularly beneficial for an object with non-uniform properties, for example a part with bumps or the like. Thus, using the techniques described herein, characteristics of different locations or instants may be gathered along a scanning axis.

Indeed, the monitoring techniques described herein may be used to calculate non-homogenous velocity patterns in objects. For example, by using multiple targets at known distances, velocity at different parts of the object may be determined. Velocity can change at different locations and angles of an object.

Figure 9:
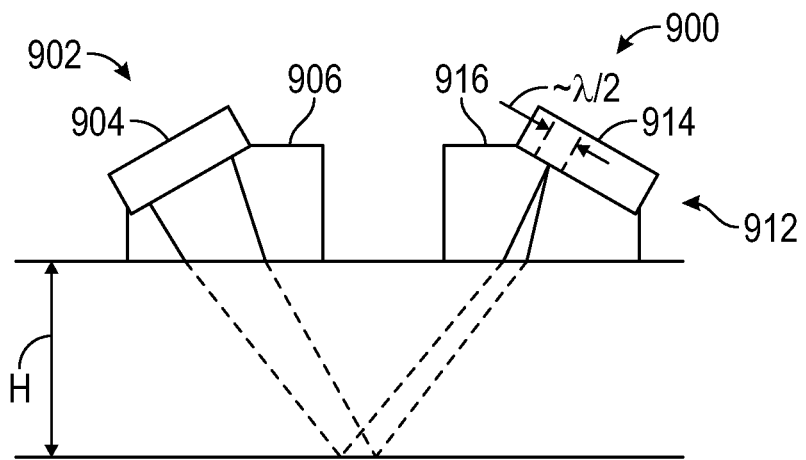
FIG. 9 illustrates an inspection system with two probes, according to an example of the present disclosure.

FIG. 9 illustrates an inspection system 900 with two probes, according to an example of the present subject matter. The inspection system 900 may include a first and a second inspection device 902, 912. Each of the inspection devices may include a transducer probe 904, 914 and a wedge 906, 916. Here, the second inspection device 912 is in place of the target device described in the above examples. The inspection devices 902, 912 may be provided as described above with reference to FIGS. 2 and/or 3.

Here, the first inspection device 902 may transmit acoustic wave(s) into or on the surface of the object, as described above with reference to FIGS. 2-6. For example, a first transducer element in the first inspection device 902 may transmit a first wave, and a second transducer element in the first inspection device 902 may transmit a second wave. A transducer element in the second inspection device 912 may receive the acoustic wave. The size (e.g., width) of the receiving transducer element may be set to approximately to $\lambda/2$, where $\lambda$ is a wavelength of the acoustic wave in the target material. A control circuit may take the information from the received acoustic wave (e.g., time of travel) and determine one or more characteristics relating to the object. The characteristics may include absorption per length, velocity, amplitude, thickness, a geometrical characteristic, and/or sensitivity. The control circuit may use a calibration model or map, as described herein.

Figure 10:
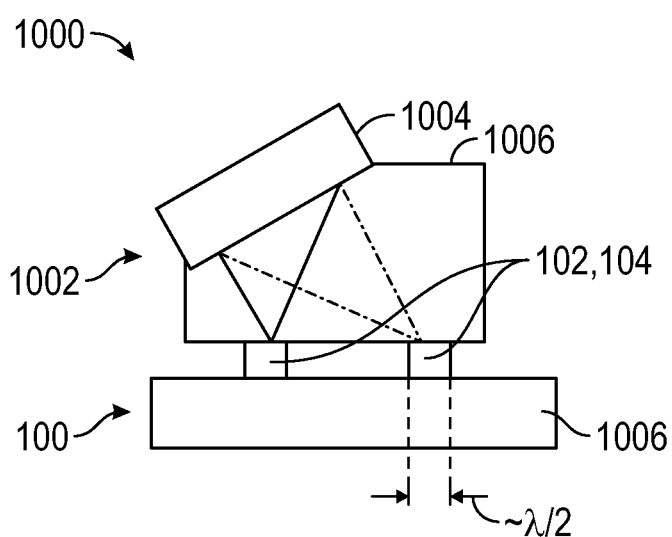
FIG. 10 illustrates an inspection system, according to an example of the present disclosure.

In addition to determining characteristics of the object, the techniques described herein may be applied for determining properties of the inspection device itself, namely the wedge. FIG. 10 illustrates an inspection system 1000, according to an example of the present subject matter. The inspection system 1000 may include an inspection device 1002 with a transducer probe 1004 and a wedge 1006, and the inspection system 1000 may also include a target device 100 with targets 102, 104 and target holder 106. The target device 100 may be provided as described herein (e.g., target device 100 of FIGS. 1-2).

Here, the target device 100 may be coupled to the inspection device 1002 as shown. The targets 102, 104 may be coupled to the wedge 1006. The inspection device 1002 may transmit one or more acoustic waves, which may reflect off the targets 102, 104. The reflected acoustic waves may then be received by the inspection device 1001. For example, a first transducer element in the inspection device 1002 may transmit first and second acoustic waves, and a second transducer element in the inspection device 1002 may receive the reflected first and second acoustic waves from the targets 102, 104, respectively. A control circuit may take the information from the received acoustic wave (e.g., time of travel) and determine one or more characteristics relating to the wedge. The characteristics may include absorption per length, velocity, amplitude, thickness, a geometrical characteristic, and/or sensitivity. In an example, characteristic of the wedges may be obtained in a first step and then characteristics of the object may be obtained in a second step using the techniques described herein. Hence, the obtained characteristics of the object in the second step may be more accurate because any variances in the wedge may be accounted for in the first step.

Figure 11:
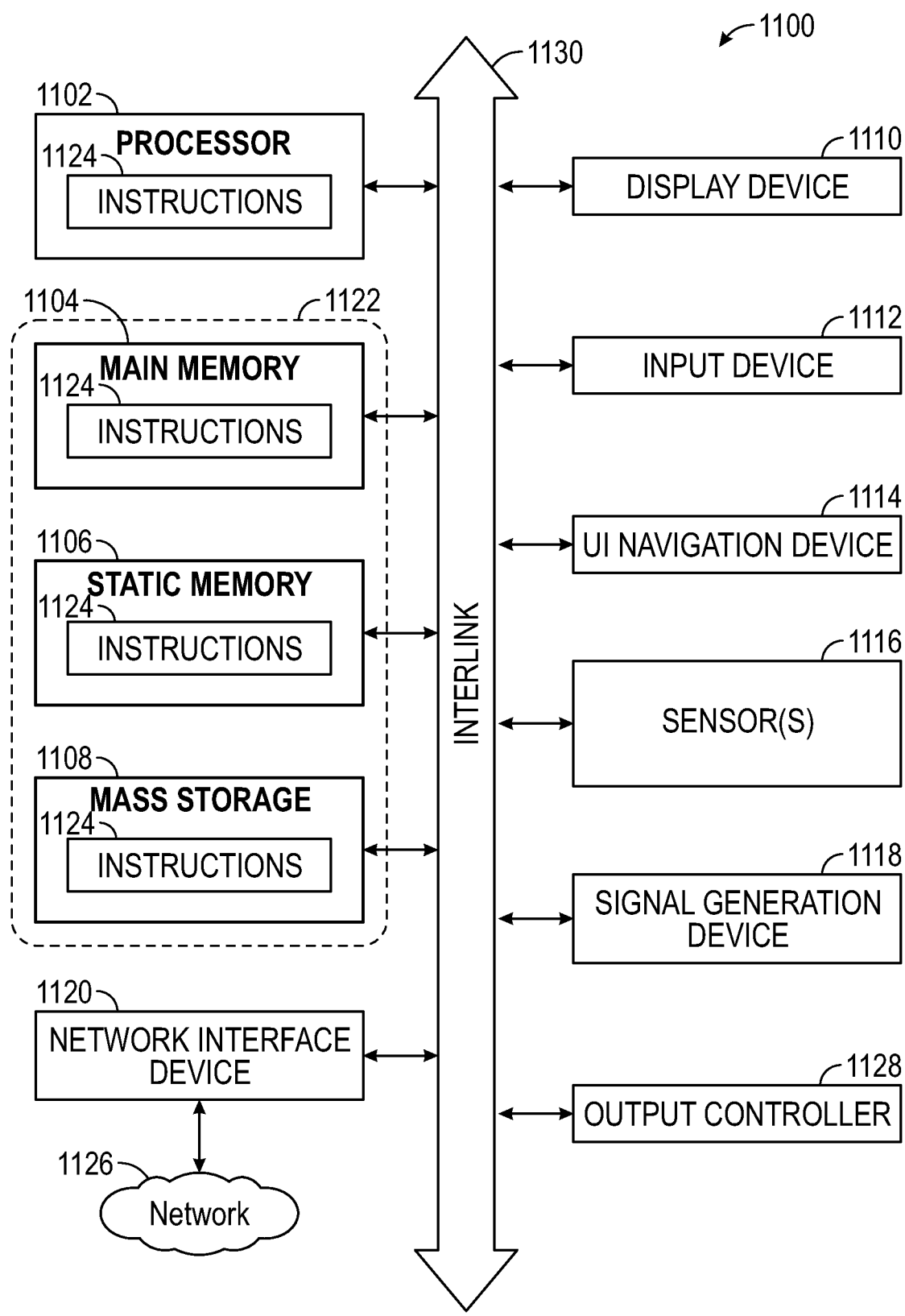
FIG. 11 illustrates a block diagram of an example comprising a machine upon which any one or more of the techniques (e.g., methodologies) discussed herein may be performed.

FIG. 11 illustrates a block diagram of an example comprising a machine 1100 upon which any one or more of the techniques (e.g., methodologies) discussed herein may be performed. In various examples, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer duster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. An inspection system comprising:
    a transducer probe configured to transmit an acoustic wave from a first location on an object;
    a target configured to be selectively coupled to a surface of the object and scatter the transmitted acoustic wave from a second location on the object to produce a returning acoustic wave including a plurality of time-series features; and
    a control circuit configured to receive information about the returning acoustic wave for simultaneous determination of a plurality of characteristics relating to physical properties of the object based on plurality of time-series features in a calibration mode, wherein the control circuit is configured to generate a system of n equations including n time-series observations and n unknown plurality of characteristics, and wherein the control circuit is configured to simultaneously calculate the n plurality of characteristics using the system of n equations, wherein n is greater than 1,
    wherein the inspection system is configured to use the plurality of characteristics for inspecting the object for potential defects in an inspection mode.

2. The inspection system of claim 1, wherein the at least one characteristic is one or more of absorption per length, velocity, amplitude, thickness, a geometrical characteristic, or sensitivity.

3. The inspection system of claim 1, wherein the target comprises material with an acoustic impedance that substantially matches an acoustic impedance of the object.

4. The inspection system of claim 1, wherein a size of the target is approximately $\lambda/2$, where $\lambda$ is a wavelength of the acoustic wave.

5. The inspection system of claim 1, wherein the target comprises two acoustically reflecting portions spaced apart on the surface, each portion configured to scatter a respective acoustic wave.

6. The inspection system of claim 1, wherein the acoustic wave is a surface wave.

7. The inspection system of claim 1, further comprising a couplant between the target and the surface of the object.

8. A method comprising:
    placing a transducer probe at a first location on a surface of an object;
    placing a target at a second location on the surface of the object, the target being selectively coupled to the surface of the object;
    transmitting an acoustic wave from the transducer probe into the object to the target to scatter the transmitted acoustic wave generating a returning acoustic wave;
    receiving the returning acoustic wave;
    based on measurements of the returning acoustic wave, simultaneously determining a plurality of characteristics relating to physical properties of the object in a calibration mode, wherein the measurements comprise a plurality of time-series features, wherein simultaneously determining the plurality of characteristics comprises:
generating a system of n equations including n time-series observations and n unknown plurality of characteristics, and
simultaneously calculating the n plurality of characteristics using the system of n equations, wherein n is greater than 1; and
performing inspection of the object for potential defects using the plurality of characteristics in an inspection mode.

9. The method of claim 8, wherein the plurality of characteristics include two or more of absorption per length, velocity, amplitude, thickness, a geometrical characteristic, or sensitivity.

10. The method of claim 8, wherein the target comprises material with an acoustic impedance that substantially matches an acoustic impedance of the object.

11. The method of claim 8, wherein a size of the target is approximately $\mu/2$, where $\lambda$ is a wavelength of the acoustic wave.

12. The method of claim 8, further comprising:
placing another target on the object spaced apart from the target at a third location;
transmitting another acoustic wave from the transducer probe into the object to scatter the transmitted another acoustic wave generating a returning another acoustic wave;
receiving the another returning acoustic wave; and
based on measurements of the received returning acoustic wave and the another received returning acoustic wave, determining the plurality of characteristics relating to the object.

13. The method of claim 8, wherein the acoustic wave is a surface wave.

14. The method of claim 8, further comprising:
applying a couplant between the target and the surface of the object.

15. The method of claim 8, further comprising:
inputting measurements from the received returning acoustic signal into a calibration model.

16. The method of claim 8, wherein the target is part of a receiving transducer probe, and wherein the acoustic wave is received by the receiving transducer probe.

17. An inspection system comprising:
a first transducer probe configured to be placed at a first location on a surface of an object and including a first transducer element and a second transducer element, wherein the first transducer element is configured to transmit a first acoustic wave and the second transducer element is configured to transmit a second acoustic wave;
a second transducer probe configured to receive the first acoustic wave and the second acoustic wave from a second location on the object using a transducer element having a size approximately $\lambda/2$, where $\lambda$ is a wavelength of the first acoustic wave; and
a control circuit configured to receive information about the received first acoustic wave and second acoustic wave and to simultaneously determine a plurality of characteristics relating to physical properties of the object, wherein the information includes a plurality of time-series features, wherein the control circuit is configured to generate a system of n equations including n time-series observations and n unknown plurality of characteristics, and wherein the control circuit is configured to simultaneously calculate the n plurality of characteristics using the system of n equations, wherein n is greater than 1,
wherein the inspection system is configured to use the plurality of characteristics for inspecting the object for potential defects in an inspection mode.

18. The inspection system of claim 17, wherein the plurality of characteristics include two or more of absorption per length, velocity, amplitude, thickness, a geometrical characteristic, or sensitivity.

19. The inspection system of claim 17, wherein the control circuit to input information about the received first acoustic wave and the second acoustic wave into a calibration model.

20. The inspection system of claim 17, wherein the first acoustic wave is a surface wave.

* * * * *

UNITED STATES PATENT AND TRADEMARK OFFICE
CERTIFICATE OF CORRECTION

Page 1 of 1

PATENT NO. : 12,372,499 B2
APPLICATION NO. : 17/445229
DATED : July 29, 2025
INVENTOR(S) : Painchaud-April et al.

It is certified that error appears in the above-identified patent and that said Letters Patent is hereby corrected as shown below:

On the Title Page

Item (72), in "Inventors", in Column 1, Lines 1-2, delete "L+3 Ancienne-Lorette" and insert --L'Ancienne-Lorette-- therefor Item (72), in "Inventors", in Column 1, Line 3, delete "L+3 Ancienne-Lorette" and insert --L'Ancienne-Lorette-- therefor In the Claims In Column 15, Line 21, in Claim 11, delete "µ/2," and insert --λ/2,-- therefor Signed and Sealed this
Fourteenth Day of October, 2025

John A. Squires
*Director of the United States Patent and Trademark Office*